United States Patent [19]

Hetzer et al.

[11] Patent Number: 4,611,464
[45] Date of Patent: Sep. 16, 1986

[54] ROTOR ASSEMBLY FOR A GAS TURBINE ENGINE AND METHOD OF DISASSEMBLY

[75] Inventors: Frederick C. Hetzer, Northford; Guy W. Miller, Vernon, both of Conn.

[73] Assignee: United Technologies Corporation, Hartford, Conn.

[21] Appl. No.: 606,060

[22] Filed: May 2, 1984

[51] Int. Cl.⁴ .......................... F02C 1/06; F02C 3/10
[52] U.S. Cl. .................................. 60/39.161; 415/189
[58] Field of Search ............... 60/39.31, 39.32, 39.161, 60/268; 415/189

[56] References Cited

U.S. PATENT DOCUMENTS

| | | | |
|---|---|---|---|
| 2,862,356 | 12/1958 | Kent et al. | 60/39.16 |
| 3,526,092 | 9/1970 | Steel | 60/39.161 |
| 3,546,880 | 12/1970 | Schwaar | 60/39.161 |
| 3,620,009 | 11/1971 | Wilde | 60/39.161 |
| 3,673,802 | 4/1972 | Krebs et al. | 60/39.162 |
| 3,756,672 | 9/1973 | Hibner | 384/99 |
| 3,792,586 | 2/1974 | Kasmarik et al. | 60/39.161 X |
| 3,823,553 | 7/1976 | Smith | 60/39.16 |
| 3,915,521 | 10/1975 | Young | 60/39.161 X |
| 4,418,528 | 12/1983 | Pellow | 60/39.31 X |

Primary Examiner—Louis J. Casaregola
Assistant Examiner—Timothy S. Thorpe
Attorney, Agent, or Firm—Gene D. Fleischhauer

[57] ABSTRACT

A rotor assembly 22 for a gas turbine engine is disclosed. The engine has a compression section 12 and a turbine section 16. Various construction details which enable the modular disassembly of the turbine section are developed. The rotor assembly includes a rotor shaft 42 extending between the compression section and the turbine section. An annular shaft 66 engages a bearing 64, is joined to a rotor blade assembly 74, and rotatably supports the rotor shaft 42.

16 Claims, 7 Drawing Figures

ROTOR ASSEMBLY FOR A GAS TURBINE ENGINE AND METHOD OF DISASSEMBLY

TECHNICAL FIELD

This invention relates to an axial flow gas turbine engine, and more particularly to a rotor assembly for such an engine, and to a method for disassembling the rotor assembly. Although the invention was conceived during work in the field of axial flow gas turbine engines, the invention has application to other fields which employ rotary machines.

BACKGROUND ART

An axial flow, gas turbine engine has a compression section, a combustion section and a turbine section. An annular flow path for working medium gases extends axially through the sections of the engine. As the working medium gases are flowed along the annular flow path, the gases are pressurized in the compression section and burned with fuel in the combustion section to add energy to the gases. The hot, pressurized gases are expanded through the turbine section to produce useful work. A portion of the useful work is transferred from the turbine section to the compression section to pressurize the working medium gases.

The engine has a stator assembly for directing the hot working medium gases through the sections of the engine and a rotor assembly for transferring work between the sections of the engine. The rotor assembly in the turbine section includes arrays of rotor blades which extend outwardly across the working medium flow path. The rotor blades have airfoils that are angled with respect to the approaching flow to receive work from the gases and to drive the rotor assembly about the axis of rotation. The stator assembly includes arrays of stator vanes which have airfoils angled with respect to the flow to direct the flow toward the rotor blades of the turbine section. The rotor assembly includes a rotor shaft having an axis of rotation extending axially in the engine to link the turbine rotor blades with associated rotor blades in the compression section. As the turbine rotor blades are driven by the hot gases about the axis of rotation, the rotor shaft drives the rotor blades in the compression section to pressurize the working medium gases.

Because the rotor airfoils and the stator airfoils direct the hot gases in the turbine section, the airfoils are bathed in the gases causing thermal stresses in the blades which can decrease their structural integrity. The first stage rotor blade and first stage stator vane have particularly vulnerable airfoils because the airfoils are close to the combustion section of the engine. In addition, sand or other abrasive particulates are often ingested by the engine and strike the airfoils causing erosion and corrosion of the airfoils even though the airfoils are coated with protective coatings. As a result, it is desirable to inspect the rotor blades and stator vanes at periodic intervals and to replace those blades and vanes which are worn.

It is desirable to inspect other portions of the rotor assembly such as the rotor shaft and the interior of the rotor blade assembly for wear and signs of high stress conditions. Like inspections of the rotor blades and stator vanes, such inspections may be difficult and time consuming to conduct if construction of the rotor assembly does not lend itself to simple disassembly or requires extensive fixturing to support the rotating parts with respect to the stationary parts.

Accordingly scientists and engineers are working to develop gas turbine engine constructions and methods of disassembling gas turbine engines which permit modular disassembly of portions of the rotor assembly to simplify disassembly and to reduce the need for fixturing the parts of the rotor assembly.

DISCLOSURE OF INVENTION

According to the present invention, a rotor assembly having a rotor shaft extending between a compression section and a turbine section includes an annular second shaft for carrying rotor blades which is supported through a bearing from the stator assembly and which is coupled to the rotor shaft to rotatably support the rotor shaft, to transmit torque between the rotor shaft and the rotor blades and to permit axial movement during disassembly between the rotor shaft and the second shaft.

In accordance with the present invention, a method of disassembly for an axial flow gas turbine engine includes the steps of uncoupling a rotor shaft and an annular second shaft-rotor blade assembly, separating the rotor shaft and the annular second shaft by relative movement between the shafts in the axial direction, and supporting the rotor blade assembly from the outer case through the annular second shaft.

A primary feature of the present invention is a rotor assembly having a rotor shaft which extends axially between the turbine section and the compression section of a gas turbine engine. Another feature is a bearing support extending inwardly from the outer case and a bearing which is positioned by the bearing support. The bearing has an axis of rotation $A_r$. A rotor blade assembly is disposed about the axis of rotation $A_r$. Another primary feature is an annular second shaft which is joined to the rotor blade assembly. The annular second shaft engages the bearing to rotatably support the rotor blade assembly and engages the rotor shaft to rotatably support the rotor shaft. The annular second shaft is capable of movement in the axial direction with respect to the rotor shaft. Another feature is a means for axially and circumferentially coupling the rotor shaft to the second shaft such as a spline connection and a spanner nut. In one embodiment the rotor shaft is a low rotor shaft of a low pressure rotor assembly. The low pressure rotor assembly includes an annular forward shaft which is similar to the annular second shaft. The annular forward shaft engages a bearing to support a fan rotor blade assembly and engages the rotor shaft to rotatably support the rotor shaft. The annular forward shaft is also capable of movement in the axial direction with respect to the rotor shaft. In one embodiment, the rotor blade assembly is the low rotor blade assembly. The bearing support extends inwardly from the outer case such that the bearing support and the rotor blade assembly are disassembled together from the gas turbine engine. In still another embodiment, the rotor blade assembly is joined to an annular shaft formed of a first element and a second element. The second element with the rotor blade assembly is separable from the first element while the first element supports the rotor shaft from the bearing and bearing support. In another embodiment, a first rotor blade assembly in the low pressure turbine is rotatably supported by an annular second shaft which is coupled to the low rotor shaft through a first coupling. In addition, a high rotor shaft is coupled through a second coupling to an annular third shaft.

The annular third shaft is joined to a second rotor blade assembly in the high pressure turbine. The low rotor shaft is disposed in a passage that provides access to the second coupling. Removal of the low rotor shaft provides access to the coupling between the high rotor shaft and the second rotor blade assembly to permit uncoupling of the second rotor blade assembly and axial movement between the second rotor blade assembly and the high rotor shaft. Finally, the high pressure turbine case is attached to an adjacent portion of the engine. The modular unit consisting of the entire turbine section may be removed by removing the low rotor shaft, uncoupling the second rotor blade assembly from the high rotor shaft and detaching the high pressure turbine case from the adjacent portion of the engine.

A primary advantage of the present invention is the modular construction of portions of the engine containing rotor blade assemblies which results from permitting relative movement between a rotor shaft for transmitting torque and an annular shaft coupled to the rotor shaft which is rotatably supported from a bearing and rotatably supports a rotor blade assembly. Another advantage is the ease of inspecting the interior of the engine rotor which results from the ability to remove modular units from the engine or to remove the rotor shaft from the engine without removing the rotor assemblies. Still another advantage is the efficiency of the engine which results from positively supporting the rotor blade assembly with respect to adjacent sealing surfaces to avoid destructive interference between the rotor blades and the seals during disassembly, assembly, and inspection of the engine. A particular advantage is the simplicity of the design which rotatably supports an annular shaft and rotor blade assembly and one end of a rotor shaft with a single bearing and bearing support.

The foregoing features and advantages of the present invention will become more apparent in the light of the following detailed description of the best mode for carrying out the invention and in the accompanying drawing.

BEST MODE FOR CARRYING OUT THE INVENTION

Figure 1:
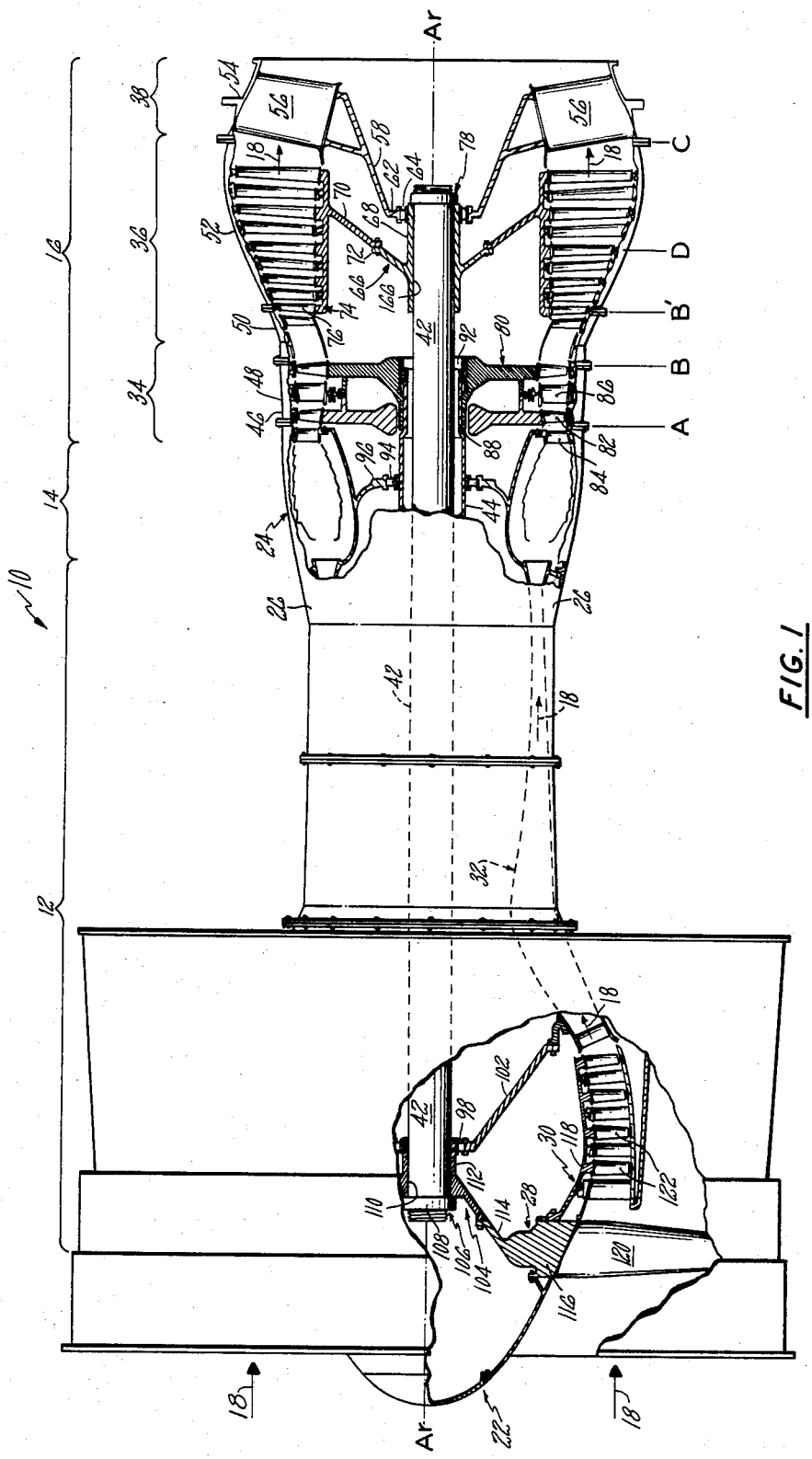
FIG. 1 is a side elevation view of a turbofan gas turbine engine with portions of the compression section and the turbine section broken away and cross sectioned to show rotor blade assemblies, annular shafts and rotor shafts in both sections of the engine.

FIG. 1 shows a turbofan, gas turbine engine embodiment 10 of the present invention which has an axis of rotation $A_r$. The engine includes a compression section 12, a combustion section 14 and a turbine section 16. An annular flow path 18 for working medium gases extends axially through these sections of the engine. The engine further includes a rotor assembly 22 which entends axially through the engine and a stator assembly 24 which supports the rotor assembly. The stator assembly includes an outer case 26. The outer case extends circumferentially about the working medium flow path and circumscribes the rotor assembly in both the turbine section and the compression section.

The compression section 12 includes two low pressure compressors such as the fan stage 28 and the first compressor 30. A high pressure compressor 32 shown in outline by the dotted lines extends between the first compressor and the combustion section 14.

The turbine section 16 includes a high pressure turbine 34, a low pressure turbine 36 and a turbine exhaust structure 38. A low rotor shaft 42 extends axially between the low pressure turbine of the turbine section and the low pressure compressors 28,30 of the compression section 12. A high rotor shaft 44, radially outward of the low rotor shaft, extends axially through the engine between the high pressure turbine and the high pressure compressor.

The outer case 26 includes a casing 46 in the turbine section 16. The casing is formed of a high pressure turbine case 48, a support case 50, a low pressure turbine case 52 and a turbine exhaust case 54. The high pressure turbine case is attached to the adjacent portion of the outer case at A. The support case is attached to the high pressure turbine case at B. Alternatively, the support case might be included as a portion of the high pressure turbine case or the low pressure turbine case; and, the exhaust case might be included as a portion of the low pressure turbine case. As shown, the low pressure turbine case is attached to the exhaust case at C, to the support case at B' and through the support case to the high pressure turbine case at B.

A plurality of exit guide vanes, as represented by the guide vanes 56, extend inwardly from the outer case in the low pressure turbine across the working medium flow path 18. A strut 58 extends inwardly from the guide vanes to form with the guide vanes a first bearing support, such as the rear bearing support 62. A first bearing, such as the rear bearing 64, extends circumferentially about the axis of rotation $A_r$ and is positioned by the rear bearing support.

An annular second shaft 66 engages the rear bearing and the low rotor shaft 42. The annular second shaft includes a first element 68 and a second element 70. The second element is attached by a plurality of bolts 72 to the first element. The first element engages the rear bearing and the low rotor shaft to rotatably support the low rotor shaft about the axis of rotation $A_r$. A first rotor blade assembly 74 is attached to the second element and is rotatably supported through the first element and the rear bearing from the outer case. The first rotor blade assembly includes arrays of rotor blades, as represented by the first array of rotor blades 76, which extend radially outwardly across the working medium flow path 18 into proximity with the low pressure turbine case. Thus, a single bearing and a single bearing support are used to rotatably support the rotor blade assembly and the low rotor shaft from the outer case. A first means 78 is provided for axially and circumferentially coupling the low rotor shaft to the annular second shaft and through the annular second shaft, to the rotor blade assembly carried by the annular second shaft.

The high pressure turbine 34 includes a second rotor blade assembly 80. Arrays of rotor blades, as represented by the second array of rotor blades 82, extend radially outwardly across the annular flow path for working medium gases. Arrays of stator vanes, as represented by the first stage stator vanes 84 and the second stage stator vanes 86, extend radially inwardly across the working medium flow path from the outer case 26. An annular third shaft 88 is joined to the second rotor blade assembly and is telescopically disposed with respect to the high rotor shaft 44. A second means 92 for axially and circumferentially coupling the third shaft to the high rotor shaft engages the high rotor shaft and the third shaft. A second bearing 94 is disposed about the high rotor shaft to rotatably support the high rotor shaft from the outer case. A second bearing support 96 extends radially inwardly from the outer case and forwardly of the high turbine case to support the second bearing.

Figure 3:
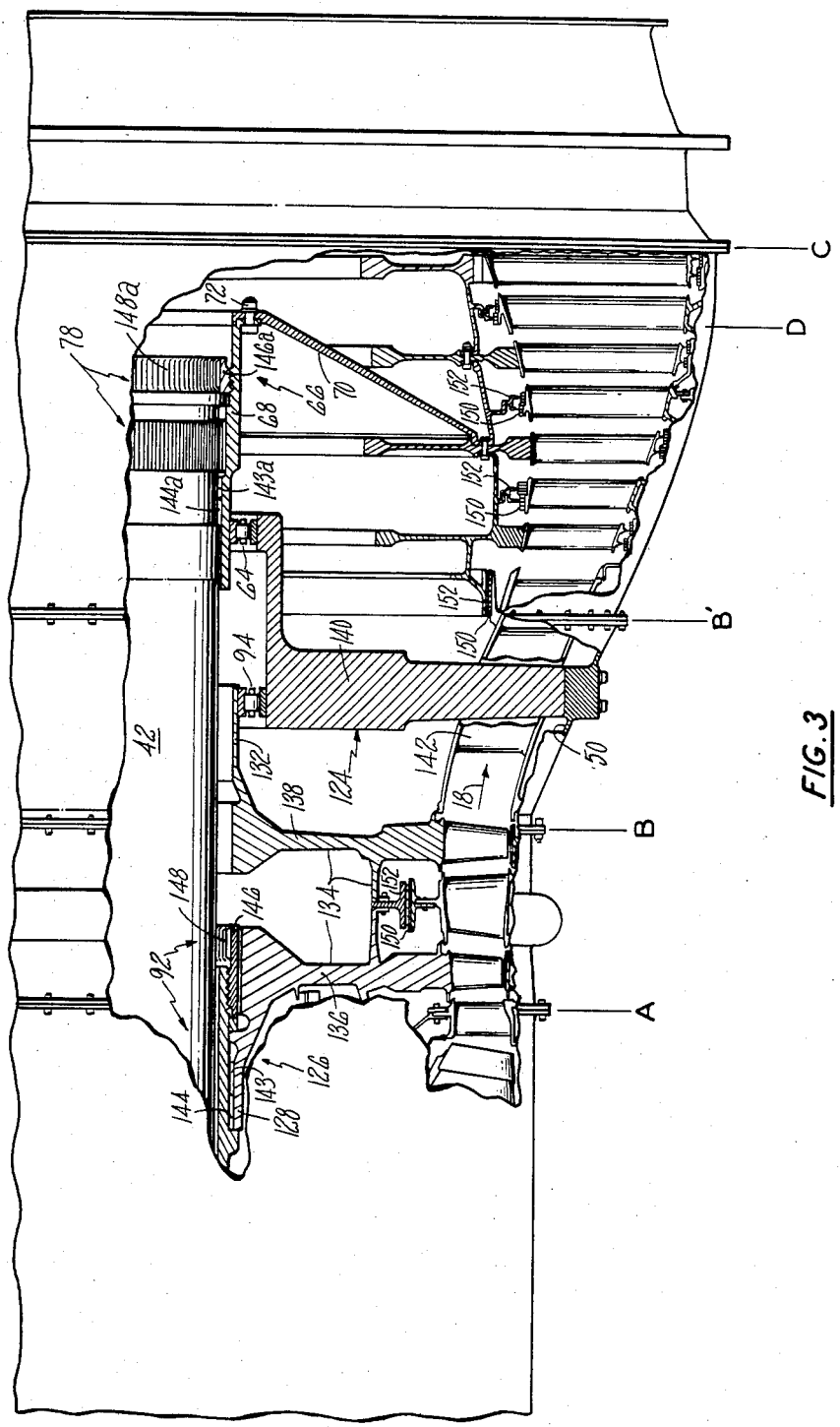
FIG. 3 is an enlarged cross-sectional view of a portion of the turbine section shown in FIG. 2.

The compression section 12 has a forward bearing 98 rotatably disposed about the axis of rotation $A_r$. A forward bearing support 102 extends radially inwardly from the outer case to support the forward bearing. A forward annular shaft 104 engages the forward bearing and is telescopically disposed with respect to the low rotor shaft 42. The forward annular shaft is capable of movement in the axial direction with respect to the low rotor shaft. A means 106 for axially and circumferentially coupling the low rotor shaft to the forward annular shaft engages the shafts. The means for coupling includes a splined nut 108 and an axially extending spline type connection 110 between the forward annular shaft and the low rotor shaft. An example of the spline type connection is shown in FIG. 3.

The forward annular shaft 104 includes a first element 112 which engages the forward bearing 98 and a second element 114. The second element extends radially outwardly. A fan rotor blade assembly 116 of the fan stage 28 and a rotor blade assembly 118 of the first compressor 32 are attached to the second element. Each rotor blade assembly has rotor blades, as represented by the fan rotor blades 120 and by the compressor rotor blades 122. The rotor blades extend radially outwardly across the annular flow path 18 for working medium gases.

Figure 2:
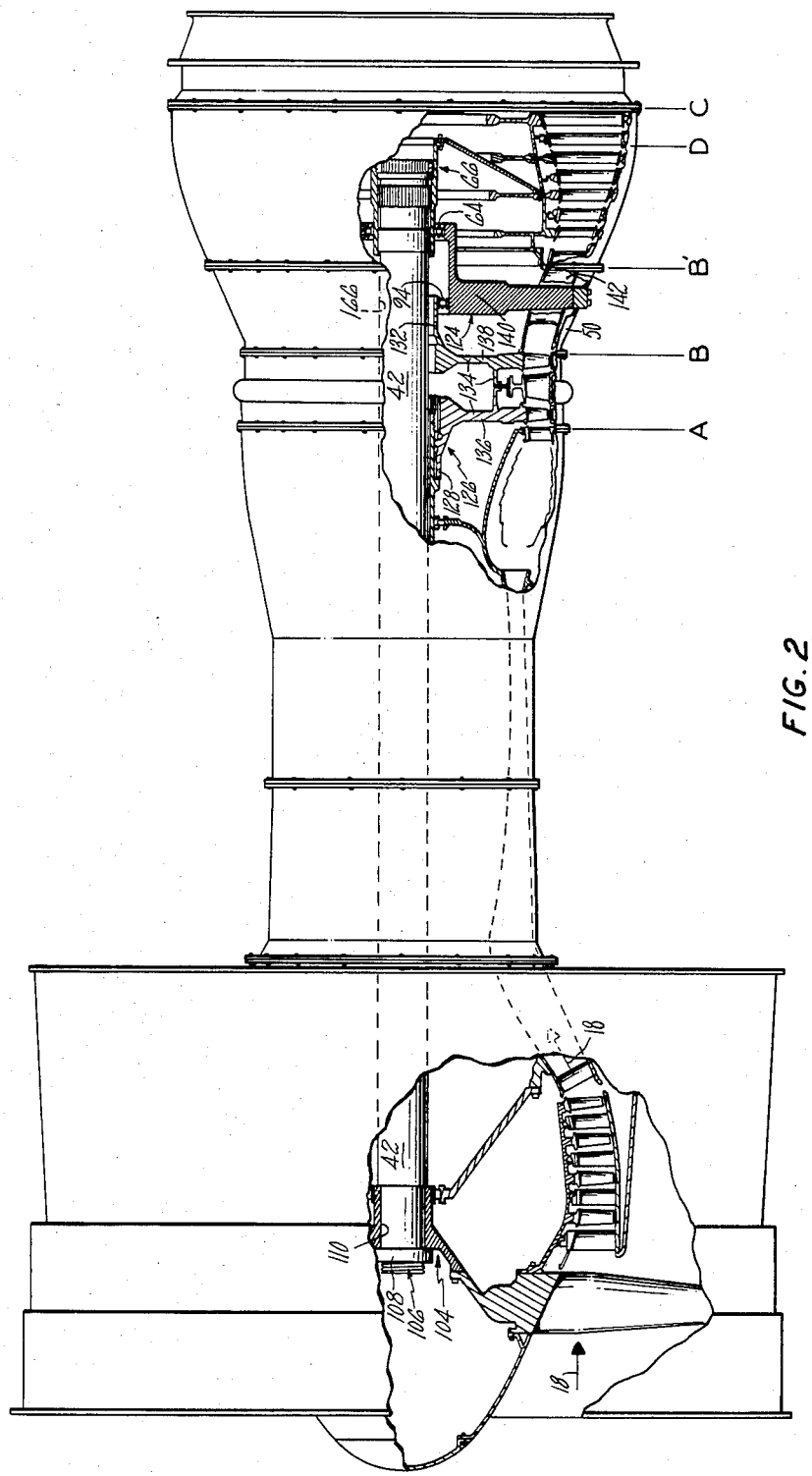
FIG. 2 is a side elevation view of an alternate embodiment of the FIG. 1 embodiment and includes a bearing support which extends inwardly from the outer case between a rotor blade assembly in the low pressure turbine and a rotor blade assembly in the high pressure turbine.

FIG. 2 is an alternate embodiment of FIG. 1 having a single bearing support 124 and an annular third shaft 126. In other respects, like numbers refer to like parts performing the same function.

The annular third shaft 126 includes a first flange 128 and a second flange 132. The first flange and the second flange are joined by an intermediate structure 134. In the embodiment shown, the intermediate structure includes a first stage rotor disk 136 and a second stage rotor disk 138.

The bearing support 124 extends radially inwardly from the support case 50. The bearing support includes a plurality of struts 140 which extend across the annular flow path 18 for working medium gases. Each strut is housed within an airfoil shaped guide vane 142 which provides an aerodynamic surface for the gases as the gases pass from the high pressure turbine to the low pressure turbine. The struts are adapted to position both the first bearing 64 and the second bearing 94. The second bearing engages the second flange 132 of the annular third shaft of the high pressure turbine. The first flange 128 of the annular third shaft is telescopically disposed with respect to the high rotor shaft and capable of movement in the axial direction with respect to the high rotor shaft.

FIG. 3 is an enlarged view of a portion of the gas turbine engine shown in FIG. 2 and shows the annular third shaft 126 telescopically disposed about the high rotor shaft. Alternatively, the annular third shaft might be telescopically disposed within the high rotor shaft. The second means 92 for coupling the high rotor shaft and the annular third shaft includes means for circumferentially coupling the shaft, such as a plurality of splines as represented by the single spline 143 on the third shaft. Each spline faces inwardly and extends axially to adapt the third shaft to slidably engage the high rotor shaft in the axial direction and fixedly engage the high rotor shaft in the circumferential direction. The spline 143 is broken away to show a single spline 144 of a plurality of associated splines 144 on the high rotor shaft which face outwardly and which extend axially along the high rotor shaft to adapt the high rotor shaft to engage the splines of the annular third shaft. The second means for coupling the shaft includes a splined nut 146 which threadably engages the high rotor shaft and abuts the annular third shaft directly or indirectly through a spacer as shown to prevent axial movement of the third shaft with respect to the high rotor shaft. The nut has a plurality of inwardly facing splines 148 which adapt the nut to engage an associated splined tool (not shown) during disassembly of the nut from the shaft. In a like manner, the first means 78 for coupling the low rotor shaft and the annular second shaft includes a means for circumferentially coupling the shaft, such as a plurality of splines 143a, which face inwardly and extend axially to adapt the second shaft to slidably engage the low rotor shaft in the axial direction and fixedly engage the low rotor shaft in the circumferential direction. The low rotor shaft has a plurality of associated splines 144a which face outwardly and which extend axially along the low rotor shaft to adapt the low rotor shaft to engage the splines of the annular second shaft. The first means for coupling the shaft includes a splined nut 146a which threadably engages the low rotor shaft 42 and abuts the annular second shaft 66 to prevent axial movement of the second shaft with respect to the low rotor shaft. The nut has a plurality of inwardly facing splines 148a which adapt the nut to engage an associated splined tool (not shown) during disassembly of the nut from the shaft.

The annular flow path 18 extends axially between stator components and rotor components. To block the leakage of working medium gases from the flow path, the gas turbine engine is provided with circumferentially extending sealing elements on the rotor components and on the stator components. Examples of such sealing elements are the sealing elements 150 on the ends of the stator vanes. Associated sealing elements on the rotor assembly, such as the sealing elements 152, are axially aligned with and radially face the sealing elements 150.

During operation of the gas turbine engine, working medium gases are compressed in the compression section 12, burned with fuel in the combustion section 14 and expanded through the turbine section 16. As these hot, high pressure working medium gases pass through the turbine section, the sealing elements 150,152 block the leakage of the working medium gases from the working medium flow path 18 to increase the efficient use of the energy contained in these gases as the gases drive the rotor assemblies of the turbine. As a result of the passage of the hot gases through these sections, the engine is periodically inspected to identify worn parts. As mentioned above, a primary advantage of the present invention is the modular construction of the turbine section which increases the ease of assembly and disassembly of both the turbine section and the rotor shaft from the engine to permit replacement or inspection of either component.

Figure 4:
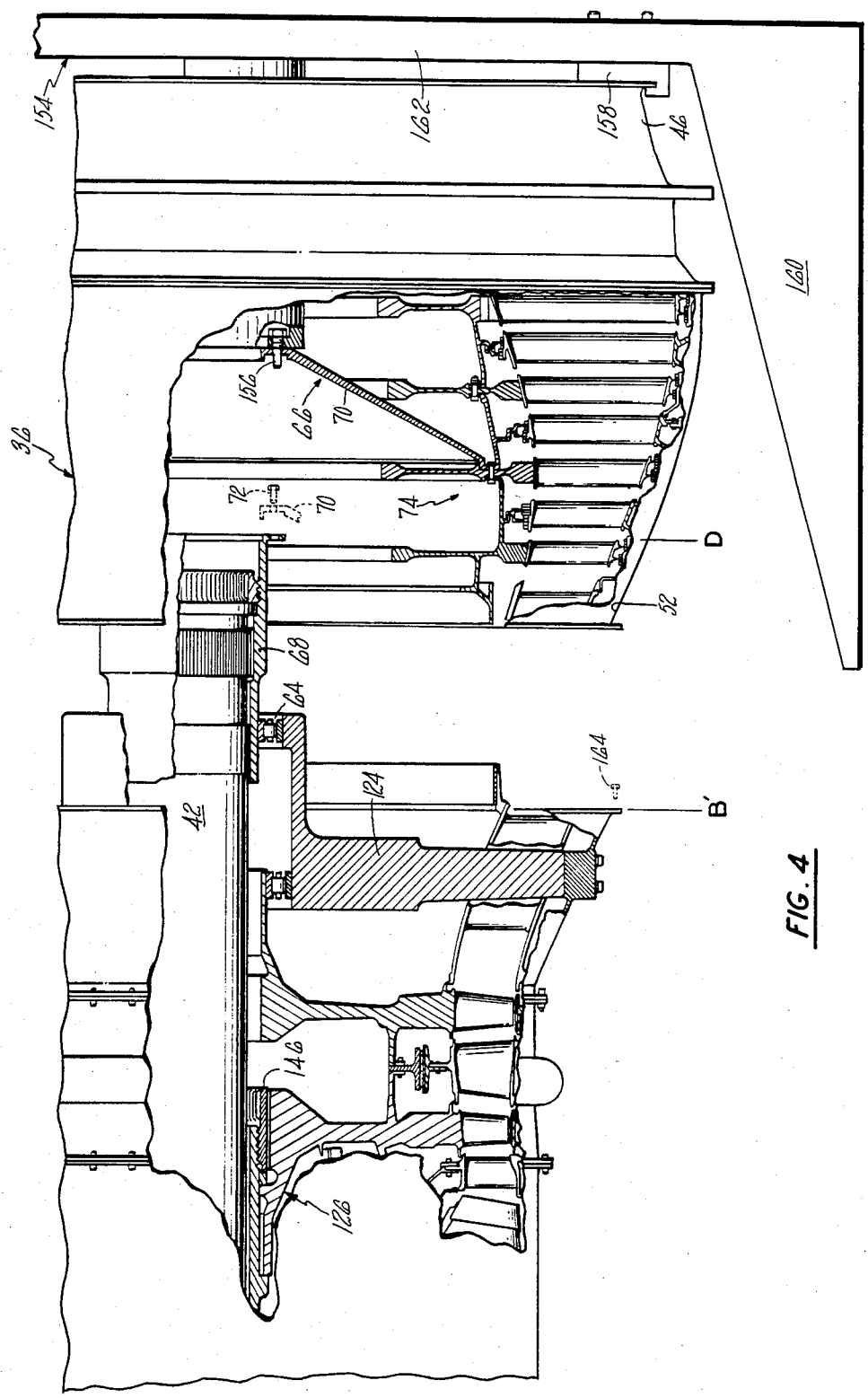
FIG. 4 is a side elevation view of the turbine section shown in FIG. 2 during disassembly.

FIG. 4 is a side elevation view of the turbine section of FIG. 3 during disassembly and shows one method of disassembling the low pressure turbine 36. Using this method permits the modular disassembly of the first rotor blade assembly 74 and low pressure turbine case 52 from the engine. The method includes the step of uncoupling the low rotor shaft 42 and the annular second shaft 66. As shown by the broken lines, removing the bolts 72 at D uncouples the second element 70 of the second shaft from the first element 68 of the second shaft. A fixture 154 is provided which has pins 156, a flange 158 and a vertical support 162 which connects the pins and the flange. The pins engage the second element of the second shaft and the flange is clamped to the casing 46 to rigidly interconnect the second shaft and the casing. The fixture is provided with a base 160 or alternatively might be provided with fittings which adapt the fixture to engage a device for moving the fixture, the casing and the rigidly interconnected second shaft.

Rigidly interconnecting the second shaft 66 with the casing 46 rigidly interconnects the rotor blade assembly 74 to the low pressure turbine case and prevents relative movement between the sealing elements 150 on the stator assembly and the sealing elements 152 on the rotor assembly.

After detaching the low pressure turbine case from the adjacent upstream portion of the outer case at B′ by removing the bolts 164, the modular unit formed by low pressure turbine case 52, the second element 70 of the annular second shaft 66 and the rotor blade assembly 74 is separated from the remainder of the engine by relative movement between the shafts 42, 66 and relative movement between the low pressure turbine case and the adjacent portion of the outer case forward of B′. This method has the advantage during disassembly of using the bearing support 124, the bearing 64 and the first element 68 to rigidly support the low rotor shaft during removal of the modular low pressure turbine from the engine.

Figure 5:
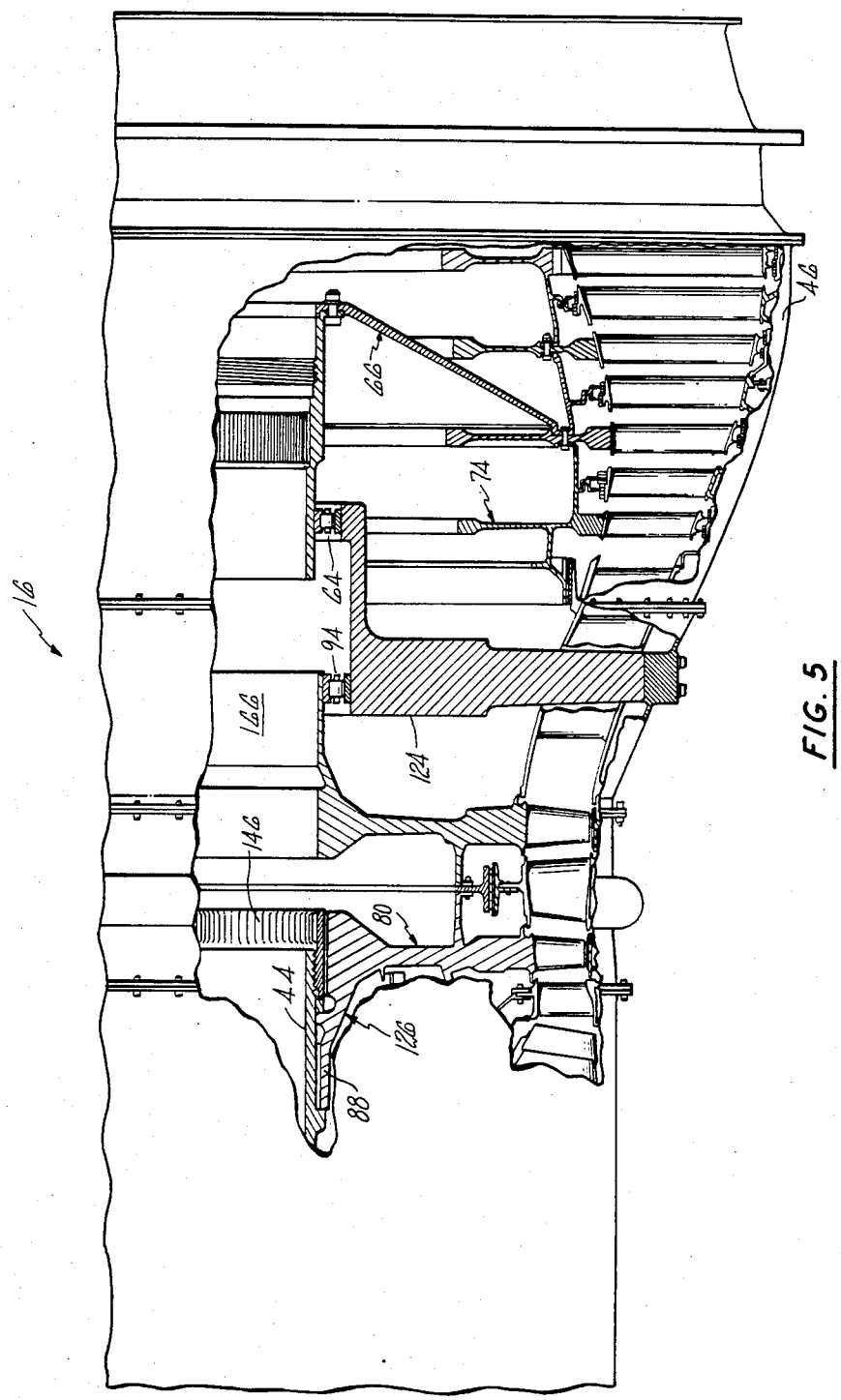
FIG. 5 is a side elevation view of the turbine section shown in FIG. 2 with the low rotor shaft removed.

As shown in FIG. 2, FIG. 3 and FIG. 5, disassembly and removal of the low rotor shaft 42 from the turbine section 16 of the engine provides an inspection passage 166 for the interior of the turbine section of the engine or an access passage to the splined nut 146 which engages the high rotor shaft 44 and locks the second rotor blade assembly 80 through the annular third shaft 88 to the high rotor shaft.

Referring to FIG. 2 and FIG. 3, disassembly of the low rotor shaft 42 shown in FIG. 2 and FIG. 3 is accomplished by uncoupling the low rotor shaft 42 from the annular second (rear) shaft 66. A splined tool (not shown) engages the splines 148a of the splined nut 146a to remove the nut from the low rotor shaft. In a like manner, the forward portion of the low rotor shaft shown in FIG. 2 is uncoupled from the forward annular shaft 104 by removing the splined nut 108 from the low rotor shaft. The sliding engagement between the spline type connection 110 at the forward portion of the shaft and the splines 143a, 144a at the rear portion of the shaft permit axial movement between the shafts once the nuts are removed from the shaft. The low rotor shaft may be completely removed from the engine or, if constructed as shown in FIG. 1, may be slid forwardly to unblock the access passage 166. Removal of the low rotor shaft is brought about by relative movement between the low rotor shaft and the annular shafts by moving the engine with respect to the shaft or pulling the shaft from the engine. As will be realized from the configuration of the low rotor shaft, the rear annular shaft and the forward annular shaft might be constructed so that disassembly is permitted by sliding the shaft forwardly with respect to the engine as shown in FIG. 1 rather than rearwardly with respect to the engine as shown in FIG. 3. In addition to providing an opportunity to inspect the low rotor shaft, removal of the low rotor shaft opens up the access passage 166 in the low pressure turbine enabling use of a second method for disassembling the low pressure turbine from the engine as a modular unit.

Figure 6:
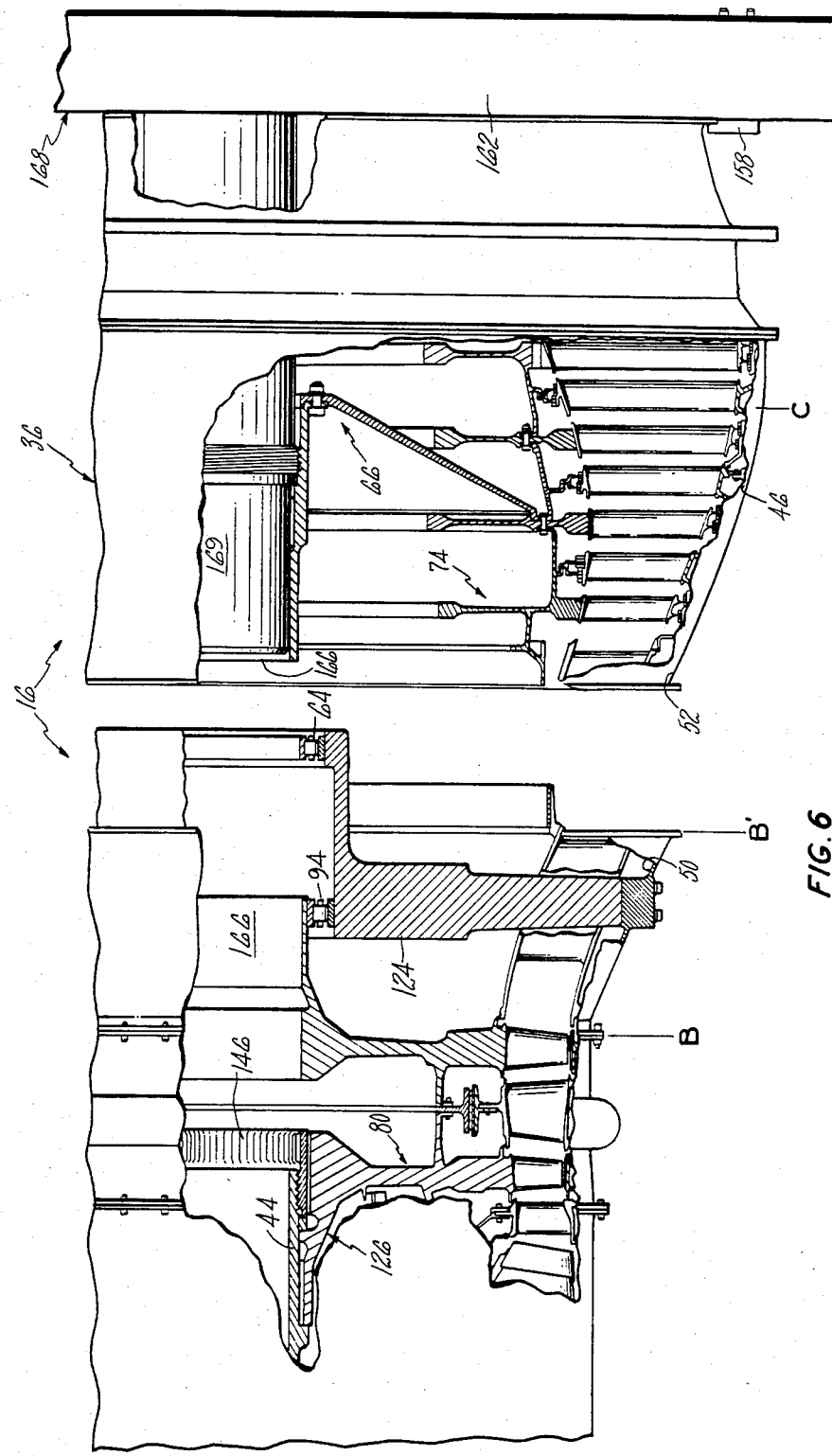
FIG. 6 is a side elevation view of the turbine section shown in FIG. 2 during disassembly of the low pressure turbine from the adjacent portion of the engine.

FIG. 6 illustrates this second method of disassembling the low pressure turbine as a modular unit. The method includes the step of uncoupling the low rotor shaft 42 from the annular shaft 66 as discussed in conjunction with FIG. 2 or FIG. 3. After removing the splined nut 146a, the low rotor shaft is movable relative to the low rotor shaft either rearwardly as shown in FIG. 2 and FIG. 3 or forwardly as shown in FIG. 1. As in the first method, the method includes the step of supporting the rotor blade assembly 74 from the casing 46 to avoid relative radial movement between the rotor blade assembly and the casing. As shown in FIG. 6, the step of supporting the rotor blade assembly 74 from the casing requires a fixture such as the fixture 168. The fixture 168 has a clamp 158 which engages the casing and has a support 169 which extends axially to threadably engage the annular second shaft to support the annular second shaft and rotor blade assembly from the outer casing. The fixture 168 is needed because the bearing 64 which supports the annular second shaft 66 is supported from the casing 46 forward of the line B′. This bearing and the bearing support 124 are separated from the low pressure turbine as the support case 50 and the low pressure turbine case are separated. An alternative method to detaching the low pressure turbine case at B′ is to detach the modular unit formed by the low pressure turbine and the support case at line B from the adjacent portion of the outer case. A fixture is not required to avoid relative radial movement between the rotor assembly and the outer case because the bearing and the bearing support are aft of the line B and engage the annular second shaft to support the annular second shaft as the low pressure turbine is removed as a unit from the engine.

As shown in FIG. 1, disassembly of the modular low pressure turbine does not require a fixture whether the low pressure turbine 36 is disassembled from the outer case at B or B′. In either case, the annular second shaft 66 is supported through the struts 58 and the rear bearing support 62 which extend inwardly from the outer case 46 at a point aft of either the line of disassembly B or the line of disassembly B′.

Figure 7:
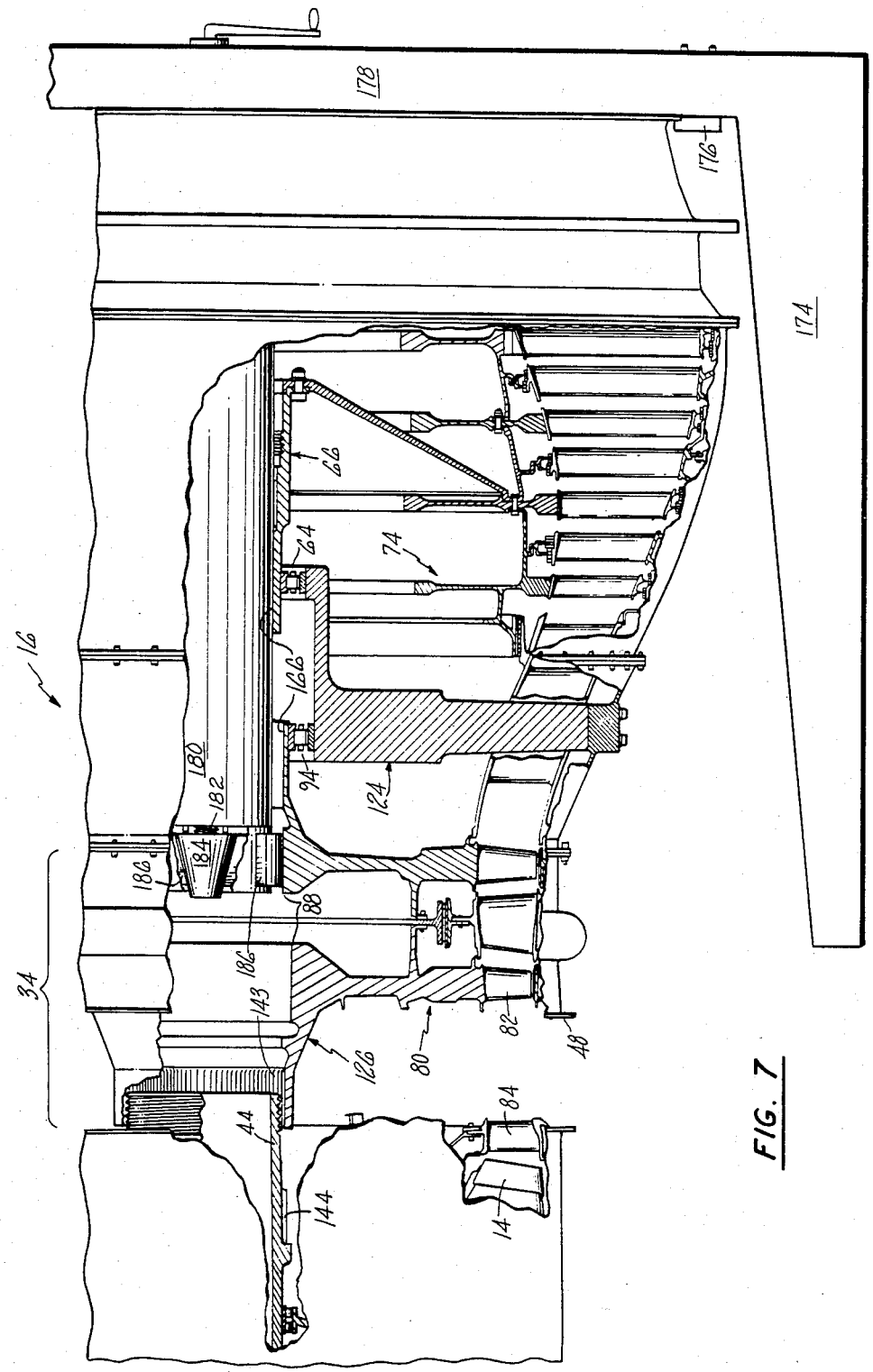
FIG. 7 is a side elevation view of the turbine section shown in FIG. 2 during disassembly of the turbine section of the engine from the adjacent portion of the engine.

FIG. 7 is a side elevation view of the turbine section 16 of FIG. 3 during disassembly and shows a method of disassembling the entire turbine section of the engine from the remainder of the engine. Removal of the entire turbine section provides immediate access to elements of the combustion section 14, to the first stage turbine vanes 84, to the first stage rotor blades 82 and to other components of the high pressure turbine 34. Referring to FIG. 1, FIG. 3, FIG. 5 and FIG. 7, the method includes the steps of uncoupling the low rotor shaft 42 from the second annular shaft 66 and removing the low rotor shaft as outlined above to open the access passage 166. Removing the shaft provides access to the second means 92 for coupling the annular third shaft 126 (or shaft 88 in FIG. 1) to the high rotor shaft 44. The second means includes splines 143 on the annular third shaft, splines 144 on the high rotor shaft and the splined nut 146 as shown in FIG. 3. Removing the splined nut from the high rotor shaft permits relative movement between the axially oriented splines 143 and the axially oriented splines 144. Detaching the high pressure turbine case 48 from the adjacent portion of the engine enables disassembly of the high pressure turbine case from the adjacent portion of the outer case and separation of the modular unit formed by the turbine section from the remainder of the engine. A fixture is not required during disassembly of the embodiment shown in FIG. 3 to support either the first rotor blade assembly 74 or the second rotor blade assembly 80 from the outer case 46. The bearing support 124, with the bearing 64 which engages the second annular shaft and with the bearing 94 which engages the third annular shaft 126, prevents relative movement between the rotor blade assemblies and the sealing elements.

A fixture may be used, similar to the fixture shown in FIG. 6, to additionally support the rotor blade assembly of the FIG. 2. embodiment and is required for disassembly of the FIG. 1 embodiment. Such a fixture has a base 174, a flange 176, a first support such as the vertical support 178, and a second support such as the horizontal support 180. The fixture includes an axially extending shaft 182 which is threaded, a first angled block 184 which threadably engages the shaft and at least two second angled blocks 186 which engage the first block and which are driven outwardly to engage the annular third shaft by axial movement of the first block.

After engaging the annular third shaft 88 or 126, the fixture rigidly interconnects the second rotor blade assembly 80 and the outer case 26 through the casing 46 to support the rotor blade assembly with respect to the outer case as the modular unit which includes the second rotor blade assembly and the annular third shaft is disassembled from the engine.

A particular advantage of disassembling the modular turbine section shown in FIG. 1 or FIG. 2 results from use of the annular second shaft 66. The annular second shaft, the bearing 64 and the bearing support 62 or 124 rigidly interconnect the outer case and the first rotor blade assembly avoiding the need for a special fixture to support the first rotor blade assembly from the outer case during disassembly of the entire turbine section from the remainder of the engine.

Although the invention has been shown and described with respect to detailed embodiments thereof, it should be understood by those skilled in the art that various changes in form and detail thereof may be made without departing from the spirit and the scope of the claimed invention.

We claim:

1. In an axial flow gas turbine engine of the type which includes a compression section, a turbine section, a flow path for working medium gases which extends axially through the sections, and a stator assembly having an outer case extending circumferentially about the working medium flow path, the engine further including a bearing supported from the outer case and disposed about an axis of rotation and a rotor blade assembly which is supported by the bearing and which has an array of rotor blades extending outwardly across the working medium flow path into proximity with the outer case, the improvement which comprises:

a rotor shaft which extends axially through the engine between the compression section and the turbine section;

a bearing which is adapted to engage an annular second shaft and to support only said rotor shaft and said annular second shaft;

a bearing support which extends radially inwardly from the outer case to support the bearing;

an annular second shaft which is joined to the rotor blade assembly, which engages the bearing to rotatably support the rotor blade assembly, which rotatably supports only said rotor shaft and which is capable of movement in the axial direction with respect to the rotor shaft; and, a means for axially and circumferentially coupling the rotor shaft to the second shaft;

wherein uncoupling of said means for coupling the rotor shaft and the second shaft permits relative movement in the axial direction between the rotor shaft and the second shaft to separate the shafts and to permit withdrawal of the rotor shaft from the engine to an extent which provides access to the interior of the engine while the second shaft supports the rotor blade assembly from the bearing to avoid relative radial movement between the rotor blade assembly and the stator assembly.

2. The gas turbine engine as claimed in claim 1 wherein the annular second shaft is telescopically disposed with respect to the rotor shaft.

3. The gas turbine engine as claimed in claim 2 wherein the rotor shaft is a low rotor shaft, wherein the turbine section includes a low pressure turbine, and wherein the bearing and the array of rotor blades are disposed in the low pressure turbine.

4. The gas turbine engine as claimed in claim 3 wherein the outer case includes a low pressure turbine case having a forward end which is adapted to be attached to an adjacent portion of the outer case and wherein said bearing support extends radially inwardly from the outer case aft of said forward end and supports said rotor blade assembly as the low pressure turbine case, the second shaft and the rotor blade assembly are separated together from the engine.

5. In an axial flow gas turbine engine of the type which includes a compression section, a turbine section, a flow path for working medium gases which extends axially through the sections, and a stator assembly having an outer case extending circumferentially about the working medium flow path, the turbine section having a low pressure turbine which includes a bearing disposed about an axis of rotation, a rotor blade assembly which is supported by the bearing and which has an array of rotor blades extending outwardly across the working medium flow path, the stator assembly in the low pressure turbine including a low pressure turbine case, the improvement which comprises:

a low rotor shaft which extends axially through the engine between the compression section and the turbine section, the rotor shaft having a plurality of splines extending radially and axially along the rotor shaft;

a bearing which is adapted to engage an annular second shaft and to support only said rotor shaft and said annular second shaft;

an annular second shaft which has a flange joined to the rotor blade assembly, which engages the bearing to rotatably support the rotor blade assembly, and which is telescopically disposed with respect to the rotor shaft to rotatably support only said rotor shaft, the second shaft having a plurality of splines extending radially and axially to adapt the second shaft to slidably engage the rotor shaft in the axial direction and fixedly engage the rotor shaft in the circumferential direction;

a nut which threadably engages the rotor shaft and abuts the second shaft to prevent axial movement of the second shaft rearwardly with respect to the first shaft; and, a bearing support which extends radially inwardly from the outer case rearwardly of the forward most portion of the low pressure turbine case to support the bearing;

wherein removal of the nut permits relative slidable movement between the rotor shaft and the second shaft to separate the rotor shaft and the second shaft and permit withdrawal of the rotor shaft from the engine to an extent which provides access to the interior of the engine and wherein the second shaft supports the rotor blade assembly from the bearing to avoid relative radial movement between the rotor blade assembly and the stator assembly during separation of the rotor shaft and the annular second shaft.

6. The axial flow gas turbine engine as claimed in claim 5 which further includes an exhaust case which is attached to the low pressure turbine case and which extends rearwardly from the low pressure turbine case and wherein the bearing support extends radially inwardly from the exhaust case.

7. The gas turbine engine as claimed in claim 3 wherein the outer case includes a low pressure turbine case having a forward end which is adapted to be attached to an adjacent portion of the outer case, wherein said bearing support extends radially inwardly from the outer case forwardly of said forward end of the low pressure turbine case, wherein the annular shaft has a first element which engages the bearing and the low rotor shaft and has a second element attached to the first element and to the rotor blade assembly, and wherein the second element and the forward end are adapted to be detached from the first element during disassembly of the low pressure turbine from the engine and wherein the bearing support supports said low rotor shaft during disassembly of the low pressure turbine from the engine.

8. The gas turbine engine as claimed in claim 7 wherein the outer case includes a high pressure turbine case and a support case which has a forward end attached to the high pressure turbine case and an aft end attached to the low pressure turbine case and wherein the bearing support is integrally attached to the support case.

9. In an axial flow gas turbine engine of the type which includes a compression section, a turbine section, a flow path for working medium gases which extends axially through the sections, and a stator assembly having an outer case extending circumferentially about the working medium flow path, the compression section having a low pressure compressor including a forward bearing disposed about an axis of rotation and including a rotor blade assembly which is supported by the forward bearing and which has an array of rotor blades extending outwardly across the working medium flow path, the turbine section having rear bearing disposed about the axis of rotation and a low pressure turbine including a rotor blade assembly which is supported by the bearing and which has an array of rotor blades extending outwardly across the working medium flow path, the improvement which comprises:

a low rotor shaft which extends axially through the engine between the compression section and the turbine section;

a rear bearing support which extends radially inwardly from the outer case to support the bearing for the low pressure turbine;

a rear annular shaft for the low pressure turbine which is joined to the rotor blade assembly in the low pressure turbine, which engages the bearing for the low pressure turbine to rotatably support the rotor blade assembly, and which is telescopically disposed with respect to the low rotor shaft and capable of movement in the axial direction with respect to the low rotor shaft;

means for axially and circumferentially coupling the low rotor shaft to the rear annular shaft;

a forward bearing support which extends radially inwardly from the outer case to support the forward bearing for the low pressure compressor;

a forward annular shaft for the low pressure compressor which is joined to the rotor blade assembly in the low pressure compressor, which engages the bearing for the low pressure compressor to rotatably support the forward rotor blade assembly, and which is telescopically disposed with respect to the low rotor shaft and capable of movement in the axial direction with respect to the low rotor shaft;

means for axially and circumferentially coupling the low rotor shaft to the forward annular shaft;

wherein uncoupling of both of said means permits relative movement in the axial direction between the low rotor shaft and the annular shafts enabling separation of the rotor shaft from said annular shafts while the annular shafts support said rotor blade assemblies from said bearings to avoid relative radial movement between the rotor blade assemblies and the stator assembly during removal of the low rotor shaft from the engine.

10. In an axial flow gas turbine engine of the type which includes a compression section, a turbine section, a flow path for working medium gases which extends axially through the sections, and a stator assembly having an outer case extending circumferentially about the working medium flow path, the turbine section having a first bearing disposed about an axis of rotation and having a low pressure turbine which includes a first rotor blade assembly supported by the first bearing which has a first array of rotor blades extending outwardly across the working medium flow path and a low pressure turbine case which is part of the outer case, the turbine section further having a second bearing disposed about an axis of rotation and having a high pressure turbine which includes a second rotor blade assembly supported by the second bearing which has a second array of rotor blades extending outwardly across the working medium flow path, and a high pressure turbine case which is part of the outer case, which is joined to the low pressure turbine case, and which has a forward end joined to the adjacent portion of the outer case, the outer case further including an exhaust case which is joined to the low pressure turbine case, the improvement which comprises:

a low rotor shaft which extends axially through the engine between the compression section and the turbine section;

a first bearing support which extends radially inwardly from the outer case to support the first bearing;

an annular second shaft which is fixed to the first rotor blade assembly, which engages the first bearing to rotatably support the rotor blade assembly and which is telescopically disposed with respect to the low rotor shaft and capable of movement in the axial direction with respect to the rotor shaft;

a first means for axially and circumferentially coupling the low rotor shaft to the second shaft;

a high rotor shaft for the high pressure turbine which extends radially outwardly of the low rotor shaft through the engine between the compression section and the turbine section;

an annular third shaft for the high pressure turbine which is fixed to the second rotor blade assembly and which is telescopically disposed with respect to the high rotor shaft and capable of movement in the axial direction with respect to the high rotor shaft, a second bearing support which extends radially inwardly from the outer case to support the second bearing at a location which enables the second bearing to engage one of said shafts for the high pressure turbine;

a second means for axially and circumferentially coupling the high rotor shaft to the annular third shaft;

wherein uncoupling of the first means permits relative slidable movement between the low rotor shaft and the second shaft to separate the low rotor shaft from the annular second shaft, wherein the annular second shaft supports the rotor blade assembly from the first bearing to avoid relative radial movement between the rotor blade assembly and the stator assembly during relative movement between the low rotor shaft and the second annular shaft, wherein removal of the low rotor shaft from the low pressure turbine of the engine permits access to the second means to enable uncoupling of the annular third shaft and rotor blade assembly from the high turbine shaft and wherein detaching the forward end of the high pressure turbine case from the adjacent portion of the outer case permits removal of the turbine section as a modular unit from the engine.

11. The gas turbine engine as claimed in claim 10 wherein the second bearing support extends radially inwardly from the outer case forward of the high pressure turbine case.

12. In an axial flow gas turbine engine of the type which includes a compression section, a turbine section, a flow path for working medium gases which extends axially through the sections, and a stator assembly having an outer case extending circumferentially about the working medium flow path, the turbine section having a first bearing disposed about an axis of rotation and a low pressure turbine including a first rotor blade assembly which is supported by the first bearing, which has a first array of rotor blades extending outwardly across the working medium flow path, and, which has a low pressure turbine case which is part of the outer case, the turbine section further having a second bearing disposed about an axis of rotation, a high pressure turbine including a second rotor blade assembly which is supported by the second bearing, which has a second array of rotor blades extending outwardly across the working medium flow path, and which has a high pressure turbine case, the high pressure turbine case being part of the outer case, being joined to the low pressure turbine case and having a forward end joined to the adjacent portion of the outer case, the outer case further including an exhaust case which is joined to the low pressure turbine case, the improvement which comprises:

a low rotor shaft which extends axially through the engine between the compression section and the turbine section, the rotor shaft having a plurality of splines which face outwardly and extending radially and axially along the rotor shaft;

a first bearing support which extends radially inwardly from the exhaust case to support the first bearing;

an annular second shaft which has a flange extending radially outwardly to the first rotor blade assembly that is joined to the first rotor blade assembly, which engages the first bearing, and which is telescopically disposed with respect to the low rotor shaft, the second shaft having a plurality of splines extending radially and axially to adapt the second shaft to slidably engage the low rotor shaft in the axial direction and fixedly engage the low rotor shaft in the circumferential direction;

a first nut which threadably engages the low rotor shaft and prevents axial movement of the second shaft rearwardly with respect to the low rotor shaft;

a second bearing support which extends radially inwardly from the outer case forwardly of the forward most portion of the high pressure turbine case to support the second bearing;

a high rotor shaft radially outward of the low rotor shaft, the high rotor shaft engaging the second bearing and extending axially through the engine between the compression section and the turbine section, the high rotor shaft having a plurality of splines extending radially and axially along the high rotor shaft;

an annular third shaft which is attached to the second rotor blade assembly and which has a plurality of splines extending radially and axially to adapt the third shaft to slidably engage the high rotor shaft in the axial direction and fixedly engage the high rotor shaft in the circumferential direction; and, a second nut which threadably engages the high rotor shaft to prevent axial movement of the third shaft rearwardly with respect to the first shaft;

wherein removal of the first nut permits relative slidable movement between the low rotor shaft and the second shaft to separate of the low rotor shaft from the annular second shaft, wherein the annular second shaft supports the rotor blade assembly from the first bearing to avoid relative radial movement between the rotor blade assembly and the stator assembly during relative movement between the low rotor shaft and the second annular shaft, wherein removal of the low rotor shaft from the low pressure turbine of the engine permits access to the second nut to enable removal of the second nut to uncouple the third shaft and rotor blade assembly from the high turbine shaft and wherein detaching the forward end of the high pressure turbine case from the adjacent portion of the outer case permits removal of the turbine section as a modular unit from the engine.

13. The gas turbine engine as claimed in claim 10 wherein the second bearing support extends radially inwardly from the outer case in the turbine section of the engine.

14. The gas turbine engine as claimed in claim 13 further including a support case which extends between the high pressure turbine case and the low pressure turbine case, which is attached to the high pressure turbine case and the low pressure turbine case to join the high pressure turbine case to the low pressure turbine case and wherein the second bearing support extends radially inwardly from the support case.

15. The gas turbine engine as claimed in claim 10 wherein the annular third shaft for the high pressure turbine engages the second bearing.

16. The gas turbine engine as claimed in claim 10 wherein the high rotor shaft for the high pressure turbine engages the second bearing.

* * * * *